United States Patent
Britto

[11] Patent Number: 6,049,954
[45] Date of Patent: Apr. 18, 2000

[54] SAFETY BUCKLE

[75] Inventor: James Joseph Britto, Westport, Mass.

[73] Assignee: The First Years, Inc., Mission Viejo, Calif.

[21] Appl. No.: 09/080,945

[22] Filed: May 19, 1998

[51] Int. Cl.⁷ .................................................. A41F 1/00
[52] U.S. Cl. ........................................ 24/573.1; 24/630
[58] Field of Search .......................... 24/630, 631, 632, 24/573.1

[56] References Cited

U.S. PATENT DOCUMENTS

| | | |
|---|---|---|
| 3,648,954 | 3/1972 | Gaylord et al. . |
| 3,694,029 | 9/1972 | Noble et al. . |
| 3,905,615 | 9/1975 | Schulman . |
| 3,954,280 | 5/1976 | Roberts et al. . |
| 4,402,548 | 9/1983 | Mason . |
| 4,738,413 | 4/1988 | Spinosa et al. . |
| 4,854,608 | 8/1989 | Barral . |
| 4,927,211 | 5/1990 | Bolcerek . |
| 5,054,853 | 10/1991 | Gillies et al. . |
| 5,088,163 | 2/1992 | Van Riesen ................................ 24/632 |
| 5,283,933 | 2/1994 | Wiseman et al. ..................... 24/632 X |
| 5,306,044 | 4/1994 | Tucker . |
| 5,438,737 | 8/1995 | Anscher et al. .......................... 24/630 |
| 5,562,326 | 10/1996 | Stroud . |
| 5,588,189 | 12/1996 | Gorman et al. ....................... 24/632 X |
| 5,659,931 | 8/1997 | Anscher ................................. 24/573.1 |
| 5,665,002 | 9/1997 | Balwanz . |

*Primary Examiner*—Anthony D. Barfield
*Attorney, Agent, or Firm*—Fish & Richardson P.C.

[57] ABSTRACT

A buckle apparatus includes first and second couplings, and a housing. The first coupling includes a first locking member and is configured to mate with a second locking member. The housing is configured for receiving the first coupling and configured to mate with the first locking member to secure the first coupling to the housing. The housing and the first coupling form a subassembly. The second coupling is configured to be received by the subassembly and includes the second locking member configured to mate with the first coupling to secure the second coupling to the subassembly.

4 Claims, 5 Drawing Sheets

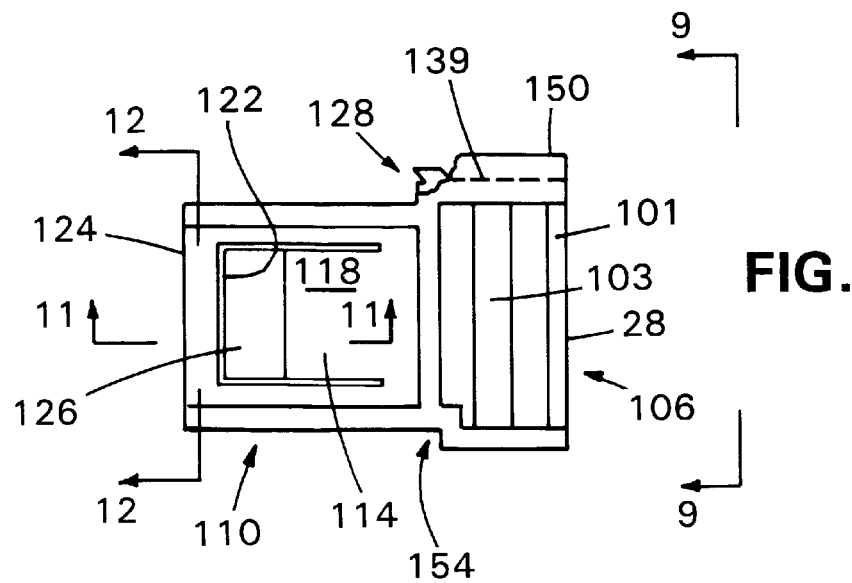
FIG. 8
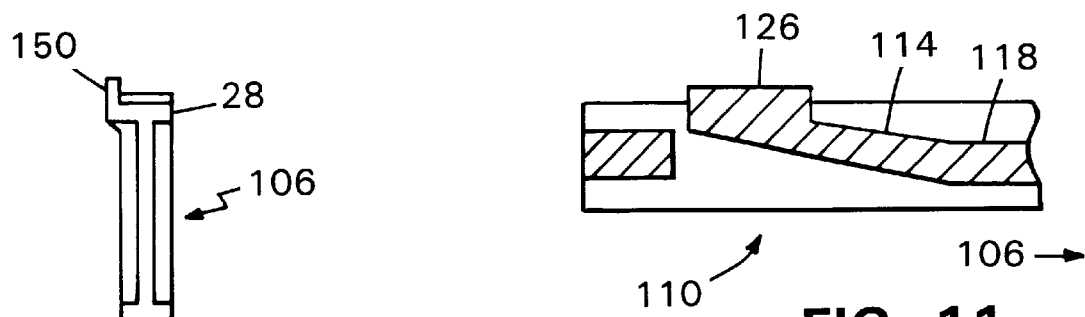
FIG. 9
FIG. 11
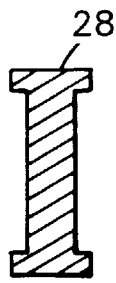
FIG. 12
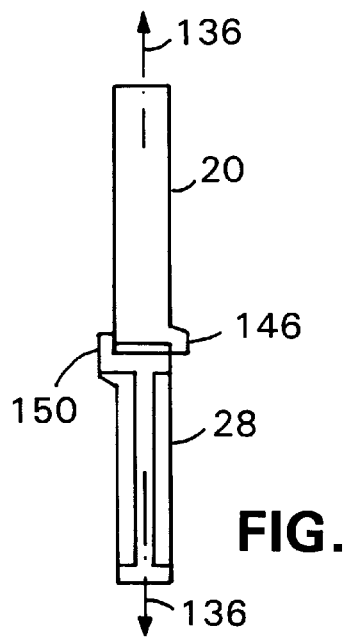
FIG. 15

6,049,954

SAFETY BUCKLE

BACKGROUND OF THE INVENTION

This invention relates to apparatus and methods for securing multiple straps to a housing. More particularly, the invention relates to a safety buckle for securing a child to a seat having waist and shoulder straps.

Child safety seats are designed to protect children. For example, car seats protect children during crashes by restraining the children to guard against the children being expelled from the seats during collisions. Typically, the seats also restrict the children from climbing out of the seat to ensure that the children are in the seat during collisions. Additionally, booster chairs, high chairs, infant carriers, etc., restrain children to reduce the risk of injury to the children, to inhibit the children from wandering off, etc. Thus, the term "seat" as used herein refers to any of a variety of types of apparatus for receiving persons, especially children. These apparatus may be presently known or yet to be invented and include, but are not limited to, car seats, booster chairs, high chairs, and infant carriers. To restrain the children, seats sometimes have five-way strap systems including two waist straps, two shoulder straps, and a crotch strap.

Present seats for children help guard against and reduce injury but present their own risks of injury to the children. For example, some seats have two shoulder straps that each have one of their ends fixed to the car seat frame and the other ends joined together, forming a "V." This configuration permits the child to become easily entangled in the two shoulder straps, risking severe injury such as strangulation. Some seats attach the left and right shoulder straps to the left and right waist straps, respectively. This arrangement also presents the risk of entanglement.

A need therefore exists for a seat system including a safety buckle arrangement that provides restraint sufficient to reduce the risk of injury due to external influences (e.g., a car collision) while also reducing the risk of self-induced injury to the child.

SUMMARY OF THE INVENTION

In general, in one aspect, the invention features a buckle apparatus. The apparatus includes first and second couplings, and a housing. The first coupling includes a first locking member and is configured to mate with a second locking member. The housing is configured for receiving the first coupling and configured to mate with the first locking member to secure the first coupling to the housing. The housing and the first coupling form a subassembly. The second coupling is configured to be received by the subassembly and includes the second locking member configured to mate with the first coupling to secure the second coupling to the subassembly.

Implementations of this aspect of the invention may also include one or more of the following features.

The first coupling may comprise a peripheral step, with the second locking member being configured to engage the peripheral step to resist separation of the second coupling from the subassembly. The second locking member may comprise a spring arm extending from the second coupling to a free end disposed away from the second coupling. The peripheral step includes a first engaging surface and the spring arm includes a second engaging surface opposing the first engaging surface when the second coupling is received by the subassembly. When the second coupling is received by the subassembly, the second engaging surface extends from a bottom surface of the spring arm away from the peripheral step and away from the first coupling. The first engaging surface extends from a top surface of the peripheral step away from the free end of the spring arm and away from the second coupling.

The subassembly may be a first subassembly, with the buckle further comprising third and fourth couplings. The third coupling includes a third locking member and is configured to mate with a fourth locking member, which is included in the fourth locking member. The housing is configured for mating with the third locking member to secure the third coupling to the housing, with the housing and the third coupling forming a second subassembly configured to receive the fourth coupling. The fourth locking member is configured to mate with the third coupling to secure the fourth coupling to the second subassembly when the fourth coupling is received by the second subassembly. The first, second, third, and fourth couplings may comprise first, second, third, and fourth alignment tabs, respectively. The first and fourth alignment tabs are disposed in interfering relationship if the first and fourth couplings are attempted to be coupled to the housing to mate the first and fourth locking members, and the second and third alignment tabs are disposed in interfering relationship if the second and third couplings are attempted to be coupled to the housing to mate the second and third locking members.

The housing may define a first opening for receiving at least a portion of the first coupling and a second opening for receiving at least a portion of the second coupling. The first coupling may comprise a peripheral step disposed adjacent to or within the housing when the first coupling is secured to the housing. The second locking member may be configured to engage the peripheral step to resist separation of the second coupling from the housing. The first opening may be configured to snugly receive at least a portion of the first coupling and the second opening may be configured to snugly receive at least a portion of the second coupling.

The first coupling may include a first strap securing portion configured to receive a first strap and the second coupling may include a second strap securing portion configured to receive a second strap. The first strap securing portion may include a first plurality of stationary bars for frictionally engaging the first strap and the second strap securing portion may include a second plurality of stationary bars for frictionally engaging the second strap.

In general, in another aspect, the invention features a system comprising a frame, a crotch strap, a pair of waist straps, a pair of shoulder straps, left and right waist strap fasteners, left and right shoulder strap fasteners, and a housing. The frame is shaped to receive a child. The crotch strap, each of the pair of waist straps, and each of the pair of shoulder straps has one end securely attached to the frame. The left and right waist strap fasteners are each configured to receive a waist strap and include left and right waist strap fastener locking surfaces, respectively. The left and right shoulder strap fasteners are each configured to receive a shoulder strap and include left and right shoulder strap fastener locking surfaces, respectively. The housing includes a plurality of openings for receiving the crotch strap, for receiving and for mating with the waist strap fastener locking members to secure the waist strap fasteners to the housing, and, with the waist strap fasteners secured to the housing, for receiving the shoulder strap fastener locking members. The right waist strap fastener locking surface and the right shoulder strap fastener locking surface, and the left waist strap fastener locking surface and the left shoulder strap fastener locking surface, are configured as opposing surfaces such that the left and right shoulder strap fastener locking surfaces will engage the left and right waist strap fastener locking surfaces, respectively, substantially within the housing to resist separation of the shoulder strap fasteners from the housing.

Implementations of this aspect of the invention may also include one or more of the following features.

The waist strap fasteners and shoulder strap fasteners may each include an alignment tab. The alignment tabs are disposed to inhibit insertion of the left waist strap fastener and the right shoulder strap fastener in a common side of the housing and to inhibit insertion of the right waist strap fastener and the left shoulder strap fastener in a common side of the housing.

In general, in another aspect, the invention provides a method of securing a person in a seat that includes a pair of shoulder straps each coupled to a shoulder strap fastener, a pair of waist straps each coupled to a waist strap fastener having a shoulder strap mating portion, and a crotch strap coupled to a housing. The method comprises steps of inserting the waist strap fasteners into the housing until a first locking member on each waist strap fastener is securely received by the housing, and inserting the shoulder strap fasteners into the housing until a second locking member on each of the shoulder strap fasteners is positioned to engage a shoulder strap mating portion of a corresponding waist strap fastener when the shoulder strap fasteners are forced in directions away from the housing.

The invention provides many advantages. For example, the invention helps ensure that two shoulder straps only form a loop with each other, through a housing, when the waist straps are secured to the housing. The invention provides 3-way and 5-way securing setups with easy assembly/coupling of straps to the housing. The shoulder straps and waist straps may be coupled to the housing independently. The shoulder straps may or may not be uncoupled from the housing independently of uncoupling the waist straps from the housing. The waist straps and shoulder straps may all be uncoupled from the housing with a single button.

Other features and advantages of the invention will be apparent from the following detailed description, and from the claims.

BRIEF DESCRIPTION OF THE DRAWINGS

FIG. 8 is an enlarged front view of a waist strap fastener of the buckle arrangement of FIG. 1.

FIG. 9 is a side view, taken along the line 9—9, of the waist strap fastener of FIG. 8.

FIG. 11 is a bottom sectional view, taken along the line 11—11, of a portion of the waist strap fastener of FIG. 8.

FIG. 12 is a cross-sectional view, taken along the line 12—12, of the waist strap fastener of FIG. 8.

FIG. 15 is a side view, taken along the line 15—15, of the assembled buckle arrangement of FIG. 13.

DESCRIPTION OF THE PREFERRED EMBODIMENTS

Figure 1:
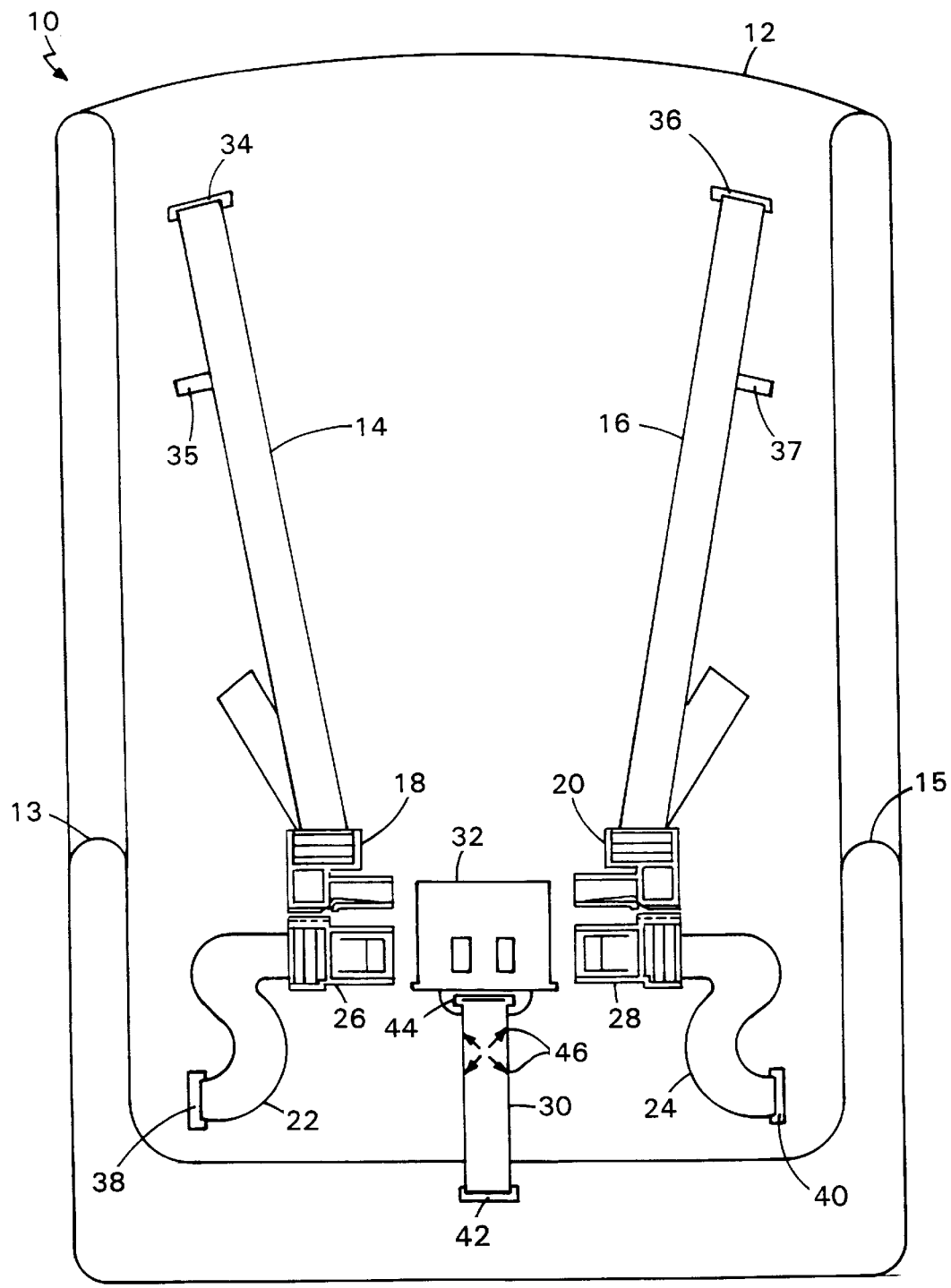
FIG. 1 is a front view of a seat and restraint system including a buckle arrangement.

As shown in FIG. 1 a system 10 includes a seat frame 12, two shoulder straps 14 and 16, two shoulder strap fasteners 18 and 20, two waist straps 22 and 24, two waist strap fasteners 26 and 28, a crotch strap 30, and a buckle or housing 32. Together, the shoulder strap fasteners 18 and 20, the waist strap fasteners 26 and 28, and the housing 32 form a buckle arrangement. The frame 12 is sized and shaped to receive a child comfortably. For example, the frame 12 may be contoured according to a typical child's body and provide amenities for comfort, e.g., armrests 13 and 15. A seat cushion (not shown) may overlay the seat frame 12 to provide a more comfortable fit for the child.

One end of each of the straps 14, 16, 22, 24 and 30 pass through openings 34, 36, 38, 40 and 42, respectively, and are anchored (not shown) to the back or bottom of the frame 12. The shoulder straps 14 and 16 may also pass through openings 35 and 37, respectively, before being anchored to the frame 12. The openings 34, 35, 36, and 37 provide height adjustment options to help ensure that the system 10 properly secures the child while providing adequate comfort.

The other ends of the straps 14, 16, 22, 24 and 30 are directly or indirectly coupled to the housing 30 to help retain a child in the seat. The shoulder straps pass through portions of shoulder strap fasteners 18 and 20 which serve as couplings to the housing 32. The waist straps 22 and 24 pass through portions of waist strap fasteners 26 and 28 which also serve as couplings to the housing 32. The crotch strap 30 passes through an opening 44 in the housing 32 and is secured against itself with stitches 46. Each of these straps are made of an appropriate material, e.g., a tight-woven nylon or polypropylene to provide strength and comfort.

Figure 2:
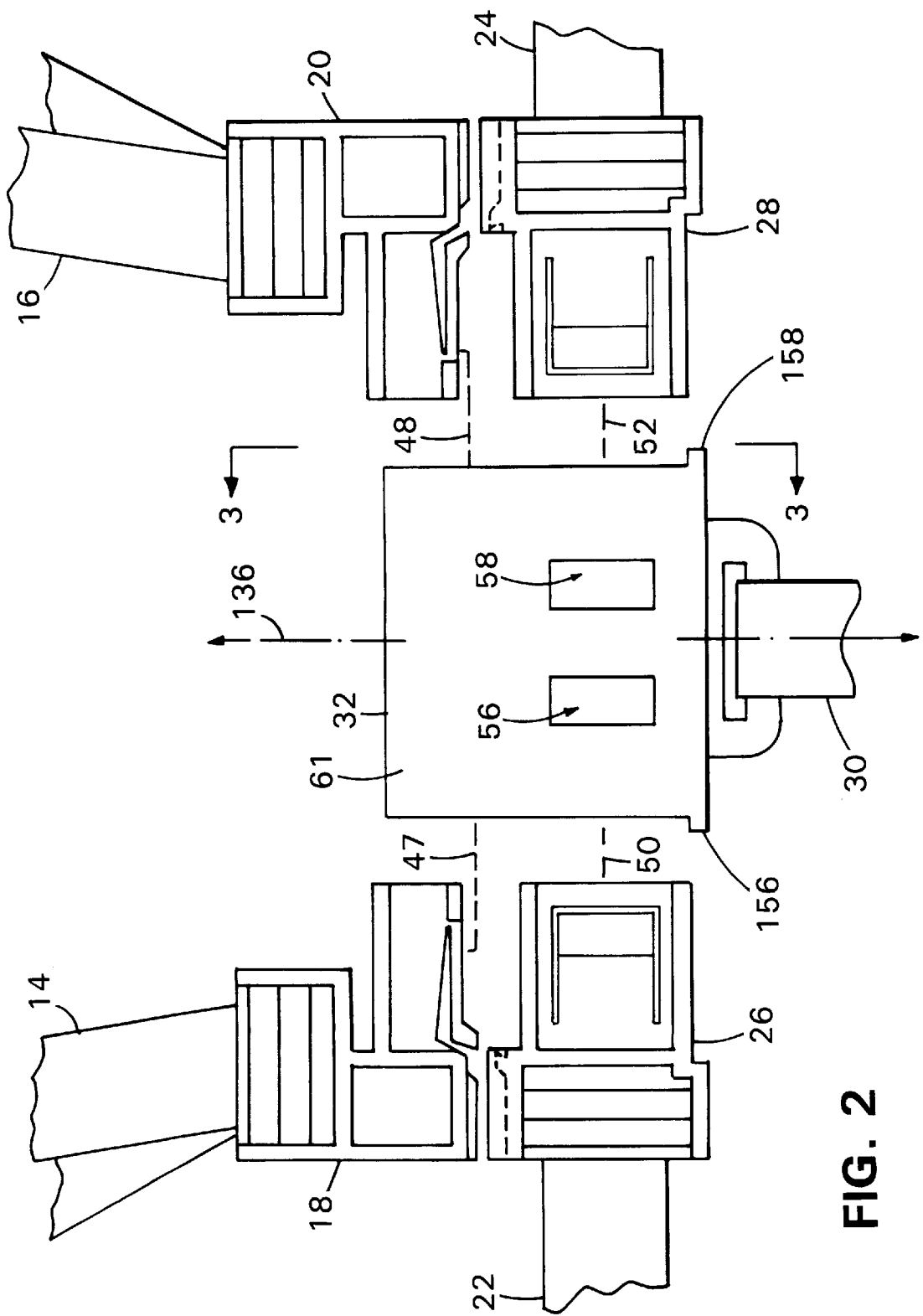
FIG. 2 is an enlarged front view of the buckle arrangement shown in FIG. 1.

As shown in FIG. 2, the housing 32 is configured to receive the shoulder strap fasteners 18 and 20 and the waist strap fasteners 26 and 28. Dotted lines 47, 48, 50 and 52 indicate insertion paths for the shoulder strap fasteners 18 and 20 and the waist strap fasteners 26 and 28 respectively.

Figure 3:
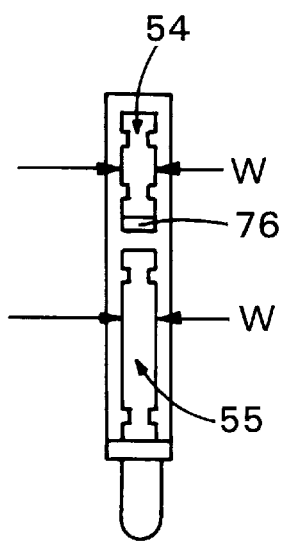
FIG. 3 is a side view of a housing of the buckle arrangement of FIG. 1.

FIG. 3 shows openings 54 and 55 in the housing 32 for receiving the shoulder strap fastener 20 and the waist strap fastener 28, respectively. Similar openings (not shown) are provided on the opposite end of the housing 32 for receiving the shoulder strap fastener 18 and the waist strap fastener 26. The openings 54 and 55 have a maximum width W of about 0.197 in. that guards against the child inserting the child's finger into the openings. The width may be different for each opening.

Returning to FIG. 2, openings 56 and 58 extend through a top wall 61 of the housing 32. The openings 56 and 58 are configured for receiving portions of the waist strap fasteners 26 and 28, respectively, when the waist strap fasteners 26 and 28 are inserted into the housing 32. Therefore, the openings 56 and 58 are disposed in the bottom portion of the housing 32 with one opening on either side of a centerline 136.

Figure 4:
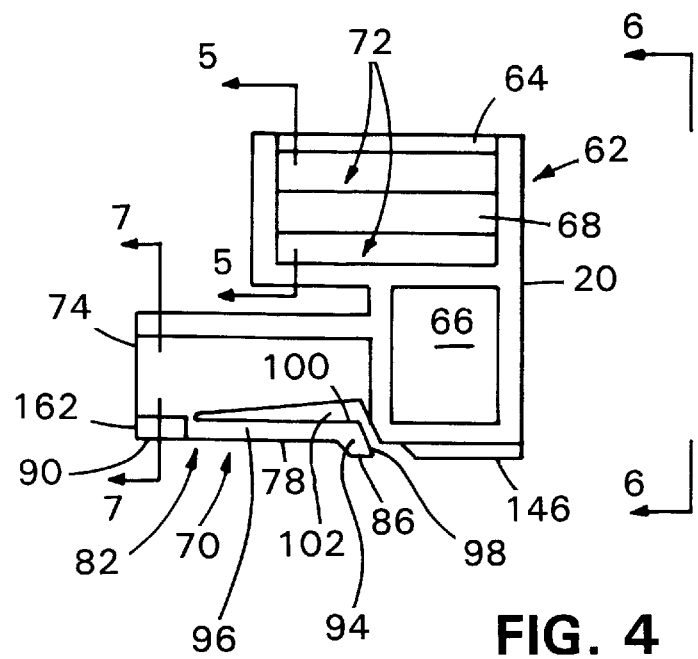
FIG. 4 is an enlarged front view of a shoulder strap fastener of the buckle arrangement of FIG. 1.
Figure 5:
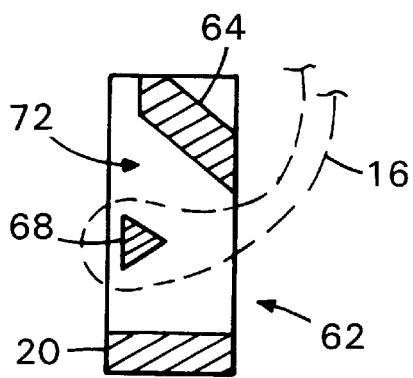
FIG. 5 is a cross-sectional view, taken along line 5—5, of a portion of the shoulder strap fastener of FIG. 4.

As shown in FIG. 4, the shoulder strap fastener 20 includes a strap securing portion 62. While FIG. 4 only shows the shoulder strap fastener 20, the shoulder strap fastener 18, as shown in FIGS. 1 and 2, is a mirror image. The strap securing portion 62 further includes two stationary bars 64 and 68 defining a strap passageway 72 as shown in cross-section in FIG. 5. The passageway 72 permits the shoulder strap 16 (shown as a dotted line in FIG. 5) to be fed through the strap securing portion 62. The bars 64 and 68 are disposed and shaped to frictionally engage the shoulder strap 16 thereby holding the shoulder strap fastener 20 in place along the shoulder strap 16. Appropriate manipulation of the shoulder strap 16, however, allows the shoulder strap fastener 20 to be moved along the length of the shoulder strap 16 to accommodate children of different sizes.

Figure 6:
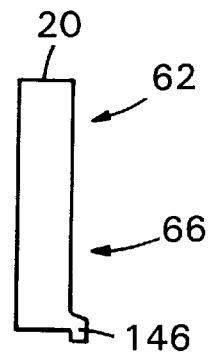
FIG. 6 is a side view, taken along the line 6—6, of the shoulder strap fastener of FIG. 4.
Figure 7:
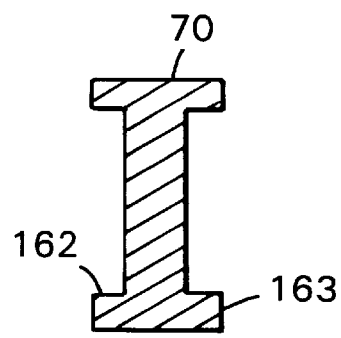
FIG. 7 is a cross-sectional view, taken along the line 7—7, of the shoulder strap fastener of FIG. 4.

Returning to FIG. 4, the shoulder strap fastener 20 further includes a grip portion 66, and an elongated portion 70. The grip portion 66 is ergonomically configured for a person to comfortably grasp the shoulder strap fastener 20. An alignment tab 146 extends from substantially the entire bottom length of the grip portion 66. As shown in FIG. 6, the alignment tab 146 extends below the bottom, and out to the back side, of the grip portion 66. A similar side view of the shoulder strap fastener 18 is a mirror image of FIG. 6. As shown in FIG. 3 and FIG. 7, a forward end 74 of the elongated portion 70 has a cross-section, as indicated by line 6—6 in FIG. 4, configured to mate with the upper and lower portions of the housing opening 54 except the bottom portion of the housing opening 54 occupied by an interior step 76 (see FIG. 3 and FIG. 13).

As further shown in FIG. 4, the elongated portion 70 includes a resilient spring arm 78 at its lower edge. The spring arm 78 has an end 82 attached to the elongated portion 70 near the forward end 74, and extends from the elongated portion 70 to a free end portion 94 disposed near the grip portion 66. The spring arm 78 can be attached to the elongated portion 70 in a variety of ways including, but not limited to, being integrally formed with the elongated portion 70 as shown. An end surface 86 of the spring arm 78 is disposed a distance away from a bottom surface 90 of the elongated portion 70. The spring arm 78 is configured to flex such that an upward force on the end surface 86 will cause the spring arm 78 to move into a recess 102 in the elongated portion 70. The free end portion 94 of the spring arm 78 extends angularly from the body 96 of the spring arm 78 such that a spring arm end surface 98 extends upwardly from the bottom surface 86 of the spring arm 78 and angularly toward the forward end 74 of the elongated portion 70 to a top surface 100 of the spring arm 78.

The front side of the elongated portion 70 further includes a reinforcement 162, shown in FIG. 4 and FIG. 7. The reinforcement 162 helps secure the shoulder strap fastener 20 in the housing 32 when inserted therein, and helps withstand forces exerted on the elongated portion 70, e.g., when the child pulls on the shoulder strap 16. The back side of the elongated portion 70 includes a similar reinforcement 163.

As shown in FIG. 8, the waist strap fastener 28 includes a strap securing portion 106 (shown with a portion broken away to reveal a peripheral step region 128, discussed below). Similar to FIG. 4, only the waist strap fastener 28 is shown, but the waist strap fastener 26, as shown in FIGS. 1 and 2, is a mirror image. The strap securing portion 106, similar to the strap securing portion 62 of the shoulder strap fastener 20, includes stationary bars 101 and 103 disposed and shaped to receive and frictionally engage the waist strap 24. An alignment tab 150 extends from substantially the entire top length of the strap securing portion 106. As shown in FIG. 9, the alignment tab 150 extends above the top, and out to the front side, of the strap securing portion 106. A similar side view of a strap securing portion of the waist strap fastener 26 is a mirror image of FIG. 9.

Returning to FIG. 8, the peripheral step region 128 is disposed only at the top of the waist strap fastener 28 behind the alignment tab 150 near a junction of the strap securing portion 106 and a housing coupling portion 110.

Figure 10:
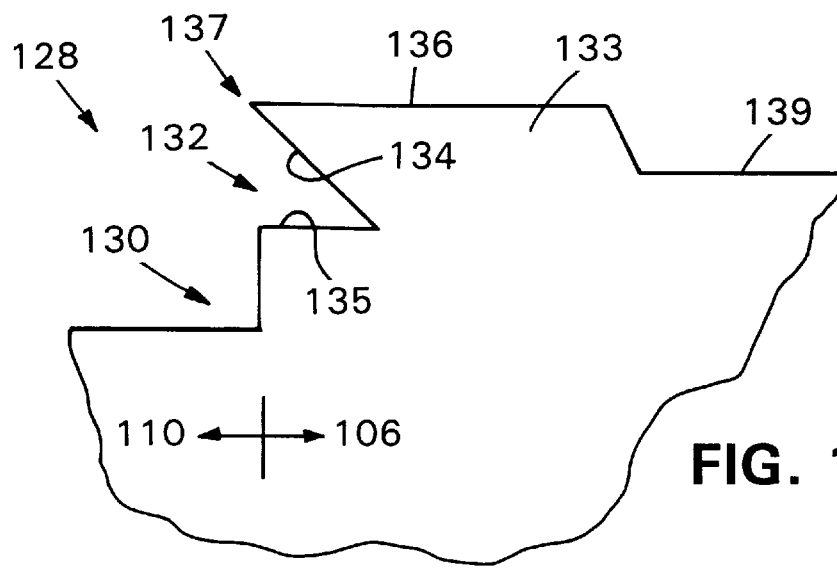
FIG. 10 is an enlarged front view of a portion of the waist strap fastener of FIG. 8.

FIG. 10 shows the peripheral step region 128 in solid lines and with the alignment tab 150 removed for clarity. The peripheral step region 128 includes a ridge 133, a first step 130 and a second step 132. The second step 132 includes a bottom surface 135 and an angled surface 134. The bottom surface 135 is vertically lower than a top surface 139 (see FIG. 8) of the strap securing portion 106. The angled surface 134 joins with a top surface 136 of the ridge 133 to form a corner 137. The angled surface 134 extends upwardly from the bottom surface 135 toward the top surface 136 and angularly toward the housing coupling portion 110 at an angle with respect to the top surface 136 that is approximately equal to the angle that the spring arm end surface 98 forms with respect to the top surface 100 of the spring arm 78. A peripheral step region of the waist strap fastener 26 is a mirror image of FIG. 10.

Referring to FIG. 8 and FIG. 11, the housing coupling portion 110 includes a spring arm 114. The spring arm 114 is, e.g., integrally formed with the housing coupling portion 110 as shown and extends away from a surface 118 of the housing coupling portion 110 toward a free end 122. A tab 126 is disposed near the free end 122 and is sized to be received by the opening 58 in the housing 32

FIGS. 3 and 12 show that the housing coupling portion 110 has a cross-section near a forward end 124, as indicated by line 11—11 in FIG. 8, configured to mate with the upper and lower portions of the housing opening 55.

Referring to FIGS. 8 and 2, a corner 154 between the housing coupling portion 110 and the strap securing portion 106 mates with a tab 158 on the housing 32. The corner 154 is further from the forward end 124 than the first step 130 (FIG. 10). A similar tab and corner arrangement is provided for the waist strap fastener 26. These mating tab and corner combinations help ensure that the waist strap fasteners 26 and 28 are inserted into the proper openings in the housing 32. For example, to attempt to insert the waist strap fastener 28 into the opening for the waist strap fastener 26, the waist strap fastener 28 must be rotated so that the tab 126 will mate with the opening 56. When this is done, however, the first step 130 will interfere with the tab 156, inhibiting insertion of the waist strap fastener 28 into the opening for the waist strap fastener 26.

Figure 13:
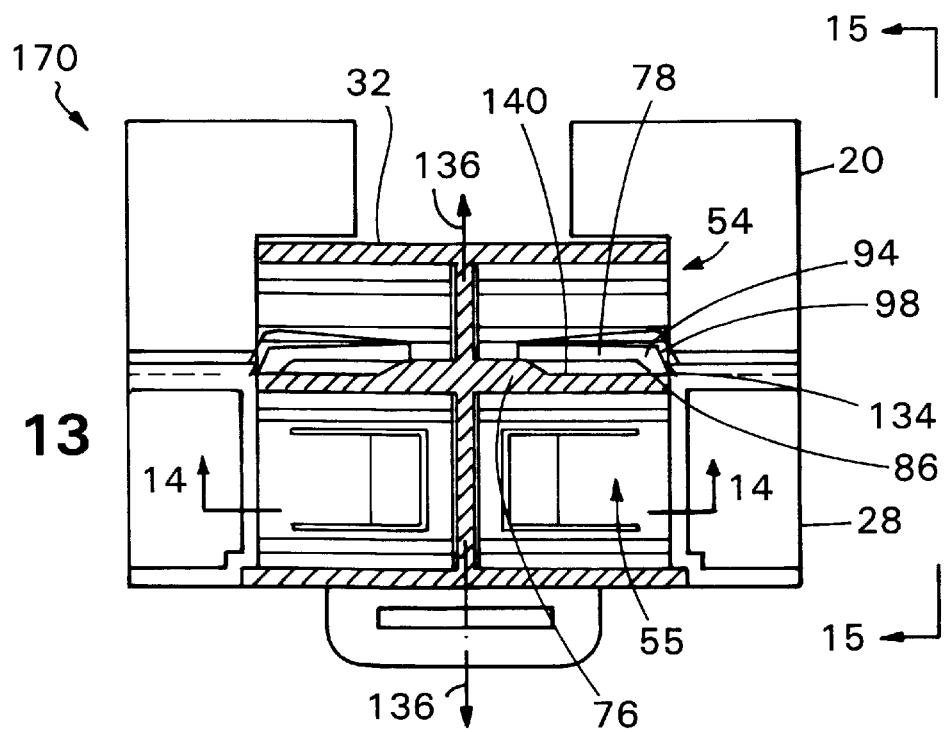
FIG. 13 is a partially diagrammatical, enlarged, front elevational view of an assembled buckle arrangement of FIG. 1 with the front of the housing broken away and the housing shown in section.
Figure 14:
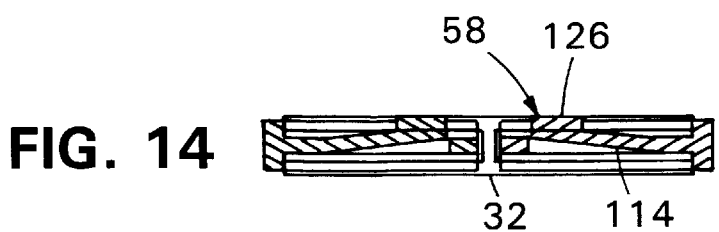
FIG. 14 is a cross-sectional view, taken along the line 14—14, of the assembled buckle arrangement of FIG. 13.

As shown in FIGS. 13 and 14, with some lines of the shoulder strap fasteners 18 and 20 and of the waist strap fasteners 26 and 28 removed for clarity in FIG. 13, the waist strap fasteners 26 and 28 and the shoulder strap fasteners 18 and 20 fit within the housing 32 to form an assembly 170. FIG. 14 shows that when the waist strap fastener 28 is inserted in the housing 32, the tab 126 snugly fits within the opening 58 of the housing 32 to secure the waist strap fastener 28 within the housing 32. A spring bias of the spring arm 114 forces the tab 126 into the opening 58. The waist strap fastener 26 is similarly secured within the housing 32.

Referring to FIG. 13, the end surface 86 of the spring arm 78 is biased against a bottom surface 140 of the opening 54 of the housing 32. The angled surface 134 of the waist strap fastener 28 and the spring arm end surface 98 of the shoulder strap fastener 20 overlap along the vertical axis 136 of the housing 32, and extend along substantially parallel planes. The angled surface 134 and the spring arm end surface 98 thus form a pair of opposing surfaces. The free end portion 94 of the spring arm 78 is disposed substantially within the housing 32. The shoulder strap fastener 18 and the waist strap fastener 26 are similarly arranged.

FIG. 15 shows that in the assembly 170 the alignment tab 146 of the shoulder strap fastener 20 and the alignment tab 150 of the waist strap fastener 28 overlap along the vertical axis 136 of the housing 32. As shown, however, the alignment tab 146 of the shoulder strap fastener 20 is on the back side of the assembly 170 while the alignment tab 150 of the waist strap fastener 28 is on the front side of the assembly 170. Similarly, an alignment tab of the shoulder strap fastener 18 is on the back side of the assembly 170 and an alignment tab of the waist strap fastener 26 is on the front side of the assembly 170. If someone tried to insert the shoulder strap fastener 18 into the opening 54 with the waist strap fastener 28 inserted into the opening 55, the alignment tabs of the shoulder strap fastener 18 and the waist strap fastener 28 would both be on the front side and would therefore interfere, preventing insertion of the shoulder strap fastener 18 into the housing 32. The same would apply with respect to the shoulder strap fastener 20 and the waist strap fastener 26, thereby guarding against crossing the shoulder straps 14 and 16 which could cause a hazard to the child.

Having the alignment tabs extend along lengths of portions of the shoulder strap fasteners 18 and 20 and the waist strap fasteners 26 and 28 provides strength to the alignment tabs. This also helps ensure that the fasteners 18, 20, 26 and 28 cannot be easily manipulated to improperly insert the shoulder strap fastener 18 on the same side of the housing 32 as the waist strap fastener 28, or the shoulder strap fastener 20 on the same side of the housing 32 as the waist strap fastener 26.

To use the system 10, the child is placed onto the seat frame 12, and the waist strap fasteners are inserted into the housing 32. To do this, first the housing 32 is pulled up between the child's legs. The waist strap fastener 28 is pulled over the child's left leg and inserted into the housing 32. The walls of the housing opening 54 serve as insertion guides to the waist strap fastener 28. The waist strap fastener 28 is inserted into the housing 32 until the spring arm tab 126 of the waist strap fastener 28 is received by the opening 58 in the housing 32. Interaction between walls of the tab 126 and walls of the housing opening 58 inhibit removal of the waist strap fastener 28 by pulling forces exerted on the waist strap fastener 28. The waist strap fastener 26 is similarly secured to the housing 32.

Once the waist strap fasteners 26 and 28 have been inserted into the housing 32, the shoulder strap fasteners 18 and 20 are inserted into the housing 32. The walls of the opening 54 in the housing 32 serve as a guide for insertion of the shoulder strap fastener 20 because these walls substantially mate with the housing coupling portion 110. As the shoulder strap fastener 20 is inserted, the end surface 86 of the spring arm 78 slides along the top surface 139 of the strap securing portion 106 and then over the ridge 133.

The shoulder strap fastener 20 is inserted into the housing 32 until the free end portion 94 of the spring arm 78 is further inside the housing 32 than the corner 137 of the peripheral step region 128. The end surface 86 of the spring arm 78 is then biased against the bottom surface 140 of the housing opening 54. Pulling forces on the shoulder strap fastener 20 will then cause the spring arm end surface 98 of the shoulder strap fastener 20 to engage the opposing angled surface 134 of the waist strap fastener 28 while the end surface 86 of the spring arm 78 engages the bottom surface 140 of the housing opening 54. The waist strap fastener 28, which is held in place in the housing 32 as discussed above, will thus inhibit removal of the shoulder strap fastener 20 from the housing 32. The shoulder strap fastener 20 is thus held/locked in the housing 32.

The waist strap fastener 28 does not have to be inserted into the housing 32 before the shoulder strap fastener 20 is inserted. For example, the shoulder strap fastener 20 may be inserted simultaneously with the waist strap fastener 28. Also, the shoulder strap fastener 20 may be inserted into the housing 32 before inserting the waist strap fastener 28. But, the shoulder strap fastener 20 will not be held in place in the housing 32 until the waist strap fastener 28 is inserted such that the tab 126 is received by the opening 58.

Any of the processes discussed can be followed for inserting and holding/locking the shoulder strap fastener 18 into the housing 32.

To remove the shoulder strap fastener 20 and the waist strap fastener 28 from the housing 32, the tab 126 is pushed out of the opening 58 while pulling on the waist strap fastener 28. When the tab 126 no longer interfaces with the walls of the opening 58, the waist strap fastener 28 can be pulled from the housing 32. Once the waist strap fastener 28 is no longer affixed to the housing 32, the shoulder strap fastener 20 can be easily removed. The shoulder strap fastener 20 may be simultaneously removed with the waist strap fastener 28. A similar process is followed to remove the waist strap fastener 26 and the shoulder strap fastener 18.

The invention helps ensure that the shoulder straps 14 and 16 are not coupled through the shoulder strap fasteners 18 and 20 to the housing 32 unless the waist straps 22 and 24 are coupled to the housing 32 through the waist strap fasteners 26 and 28. Using the waist straps 22 and 24 helps ensure that the child cannot climb free. Helping ensure that the waist straps 22 and 24 are secured to the housing 32 before the shoulder straps 14 and 16 can be secured to the housing 32, thereby forming a loop, helps ensure that a child cannot climb free and become entangled.

The invention also helps ensure that the shoulder strap fasteners 18 and 20 are not separated from the housing 32 until the waist strap fasteners 26 and 28 are separated from the housing 32. Because the spring arm 78 of the shoulder strap fastener 20 is substantially within the housing 32 when the shoulder strap fastener 20 is locked in place, it is difficult to reach the spring arm 78 in order to move it into the recess 102 (with a similar arrangement for the shoulder strap fastener 18). This inhibits separation of the shoulder strap fasteners 18 and 20 from the housing 32 until the waist strap fasteners 26 and 28 are separated from the housing 32. Other configurations could also be used. For example, the spring arm 78 could protrude from the housing 32 more than is shown in FIG. 13, when the shoulder strap fastener 20 is secured to the housing 32, and still inhibit a person's ability to move the spring arm 78 into the recess 102.

Other embodiments are within the scope of this invention. For example, the openings in the housing 32 for receiving the shoulder strap fasteners 18 and 20 need not be the same. The openings, and corresponding cross sections of the shoulder strap fasteners 18 and 20, may be different to guard against inserting the shoulder strap fastener 18 into the opening designed for the shoulder strap fastener 20, or vice versa. The different openings may require the spring arms to be offset, e.g., toward the front of the housing 32.

Also, many other configurations can be used to secure the waist strap fasteners within the housing 32 and to inhibit the shoulder strap fasteners from being removed from the housing 32 when the waist strap fasteners 26 and 28 are in place. For example, the spring arm 78 could extend from an end of the elongated portion 70 near the grip portion 66 toward the forward end 74 of the elongated portion 70, with the free end portion 94 angled backwards (toward the grip portion 66) to form a hook arrangement.

The shoulder strap fasteners 18 and 20 may also be configured to be removed from the housing 32 without having to release the waist strap fasteners 26 and 28 first. For example, the spring arm 78 could extend outside of the housing 32 in the assembly 170 far enough to allow someone to pull the spring arm 78 into the recess 102. Or, rods could extend from the spring arm 78 outside of the housing 32 and be manipulated in order to pull the spring arm 78 into the recess 102.

Also, a single button release mechanism could be arranged to release both of the waist strap fasteners 26 and 28 at the same time. For example, a single button with a dual-plunger could be used to push the tabs of the waist strap fastener spring arms out of the openings 56 and 58 at the same time.

What is claimed is:

1. A buckle apparatus comprising:
    a first coupling including a first locking member and being configured to mate with a second locking member;
    a housing configured for receiving the first coupling and configured to mate with the first locking member to secure the first coupling to the housing, the housing and the first coupling forming a subassembly;
    a second coupling configured to be received by the subassembly, the second coupling including the second locking member configured to mate with the first coupling to secure the second coupling to the subassembly;
    wherein the first coupling comprises a peripheral step;
    wherein the second locking member is configured to engage the peripheral step to resist separation of the second coupling from the subassembly; and
    wherein the second locking member comprises a spring arm extending from the second coupling to a free end disposed away from the second coupling, and wherein the peripheral step includes a first engaging surface and the spring arm includes a second engaging surface opposing the first engaging surface when the second coupling is received by the subassembly.

2. The buckle of claim 1 wherein when the second coupling is received by the subassembly, the second engaging surface extends from a bottom surface of the spring arm away from the peripheral step and away from the first coupling, and wherein the first engaging surface extends from a top surface of the peripheral step away from the free end of the spring arm and away from the second coupling.

3. A buckle apparatus comprising:
    a first coupling including a first locking member and being configured to mate with a second locking member;
    a housing configured for receiving the first coupling and configured to mate with the first locking member to secure the first coupling to the housing, the housing and the first coupling forming a subassembly;
    a second coupling configured to be received by the subassembly, the second coupling including the second locking member configured to mate with the first coupling to secure the second coupling to the subassembly;
    wherein the subassembly is a first subassembly, the buckle further comprising:
    a third coupling including a third locking member and configured to mate with a fourth locking member; and
    a fourth coupling including the fourth locking member;
    wherein the housing is configured for mating with the third locking member to secure the third coupling to the housing, the housing and the third coupling forming a second subassembly configured to receive the fourth coupling; and
    wherein the fourth locking member is configured to mate with the third coupling to secure the fourth coupling to the second subassembly when the fourth coupling is received by the second subassembly.

4. The buckle of claim 3 wherein the first, second, third, and fourth couplings comprise first, second, third, and fourth alignment tabs, respectively, the first and fourth alignment tabs being disposed in interfering relationship if the first and fourth couplings are attempted to be coupled to the housing to mate the first and fourth locking members, and the second and third alignment tabs being disposed in interfering relationship if the second and third couplings are attempted to be coupled to the housing to mate the second and third locking members.

* * * * *